(12) United States Patent
Srivastava et al.

(10) Patent No.: US 9,323,753 B2
(45) Date of Patent: Apr. 26, 2016

(54) METHOD AND DEVICE FOR REPRESENTING DIGITAL DOCUMENTS FOR SEARCH APPLICATIONS

(75) Inventors: Alok Srivastava, Bangalore (IN); M N S Bharadwaj, Bangalore (IN); Shatrughan Singh, Bangalore (IN); Tarun Pangti, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 442 days.

(21) Appl. No.: 13/403,170

(22) Filed: Feb. 23, 2012

(65) Prior Publication Data

US 2012/0215807 A1    Aug. 23, 2012

(30) Foreign Application Priority Data

Feb. 23, 2011    (IN) .............................. 524/CHE/2011

(51) Int. Cl.
*G06F 17/00*    (2006.01)
*G06F 17/30*    (2006.01)

(52) U.S. Cl.
CPC ...... *G06F 17/3002* (2013.01); *G06F 17/30321* (2013.01); *G06F 17/30327* (2013.01)

(58) Field of Classification Search
CPC .............. G06F 17/30; G06F 17/30327; G06F 17/30864

USPC .......................................................... 715/273
See application file for complete search history.

(56) References Cited

U.S. PATENT DOCUMENTS

| 2004/0044659 | A1* | 3/2004 | Judd | ................... G06F 17/3053 |
| 2011/0093464 | A1* | 4/2011 | Cvet et al. | ..................... 707/737 |
| 2011/0219000 | A1* | 9/2011 | Kusumura | ..................... 707/737 |

OTHER PUBLICATIONS

"An efficient inverted index technique for XML document using RDBMS," Seo et al., 2002, Elsevier Science B.V., pp. 11-22.*

* cited by examiner

*Primary Examiner* — Andrew McIntosh
(74) *Attorney, Agent, or Firm* — Jefferson IP Law, LLP

(57) ABSTRACT

A method and a device for representing digital documents for search applications are provided. The method includes periodically obtaining one or more digital documents stored in a memory of a handheld device, and generating a compressed representation of the one or more digital documents stored in the memory using one or more balanced trees. Additionally, the method includes receiving a search query including one or more words from a user of the handheld device for searching for one or more digital documents, and retrieving the one or more digital documents including the one or more words by traversing through a digital document map table and providing a search result including the one or more retrieved digital documents on the display of the handheld device if it is determined that the one or more words correspond to the one or more nodes in the word balanced tree.

25 Claims, 9 Drawing Sheets

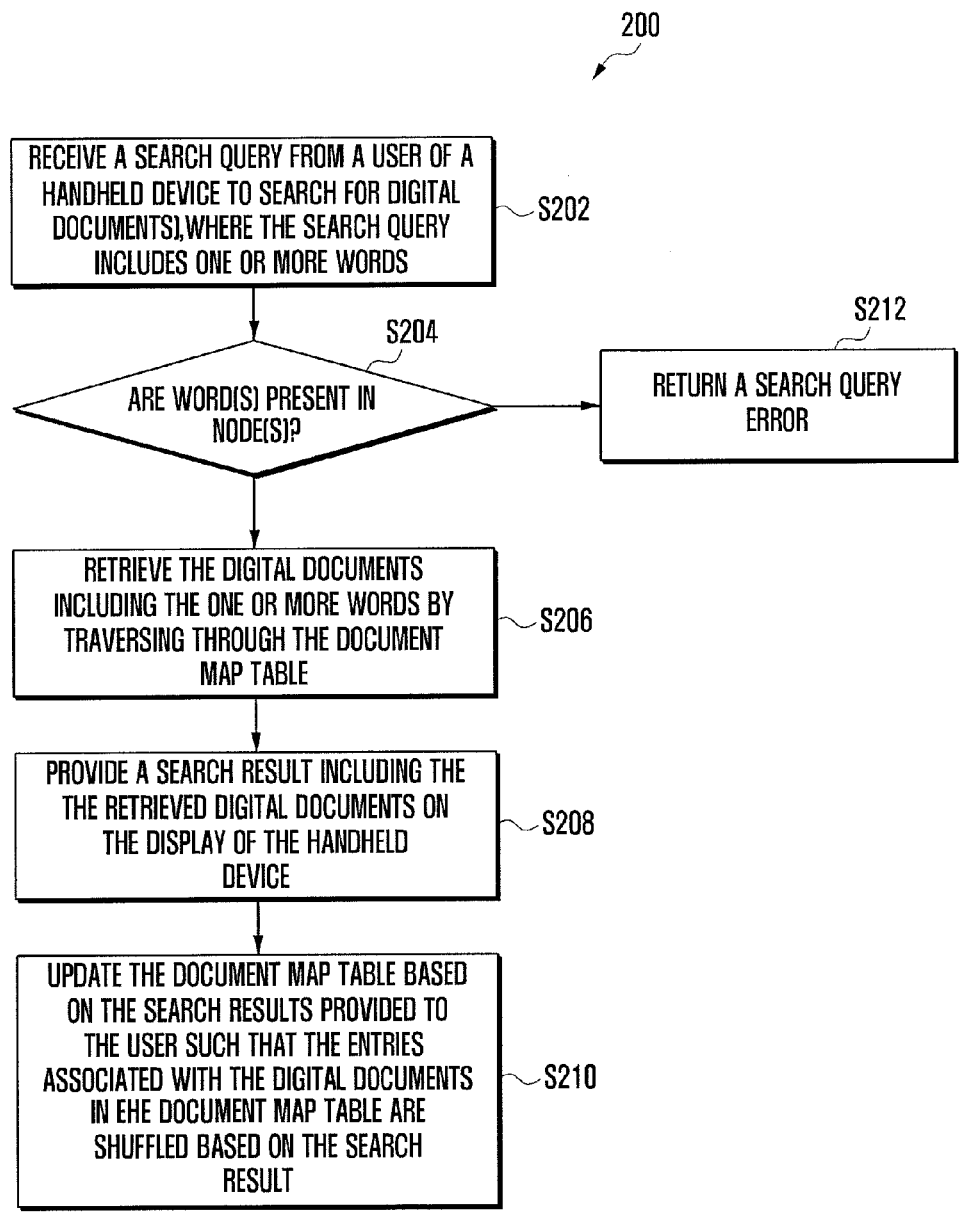

FIG. 6A

Page Table

| Page ID | Memory Address | File Offset | Status |
|---|---|---|---|
| 1 | 0x322555 | 0 | In Memory |
| 2 | Null | 1024 | In Memory |
| 3 | 0x322432 | 2048 | In Memory |
| .... | .... | .... | .... |
| n | .... | .... | .... |

FIG. 6B

Data File

| Page 1 | Page 2 | Page 3 | Page 4 |
|---|---|---|---|
| Page 5 | Page 6 | Page 7 | Page 8 |
| .... | .... | .... | .... |
| .... | .... | .... | .... |
| .... | .... | .... | Page n |

METHOD AND DEVICE FOR REPRESENTING DIGITAL DOCUMENTS FOR SEARCH APPLICATIONS

PRIORITY

This application claims the benefit under 35 U.S.C. §119 (a) of a Indian patent application filed on Feb. 23, 2011 in the Indian Intellectual Property Office and assigned Serial No. 524/CHE/2011, the entire disclosure of which is hereby incorporated by reference.

BACKGROUND OF THE INVENTION

1. Field of the Invention

The present disclosure relates to a field of search and retrieval systems for a handheld device. More particularly, the present invention relates to efficient representation of digital documents to enable searching of digital documents in the handheld device.

2. Description of the Related Art

Handheld devices have evolved greatly both in terms of functionality and storage capacities. The handheld devices are provided with several pre-loaded applications and a lot more applications are available to be downloaded. With enhanced and enlarged storage capacities, a size of the data of content and digital documents stored in the handheld devices may be in a gigabytes range.

As memory storage on the handheld devices grows ever cheaper and capacious, a device may hold thousands of files and keeping track of every single file is an increasingly complicated job. Searching relevant content has become important for users of the handheld devices such that there exists a dedicated search engine for almost each search requirement. For example search engines can be classified based on content and topic (e.g., business, enterprise, job, legal, medical, news, people and so on), based on information type (e.g.,. forum, blog, multimedia, email, maps, price, bittorrent, etc.) and based on model (e.g., open source engine, semantic browsing engine, social search engine, desktop search engine, etc.).

In recent years, there has been a paradigm shift in content and document search, and the focus has now shifted to a local domain rather than a global domain so as to give relevant results to a user. For example, searching "pizza hut" should return only local search results rather than global results. Now this search paradigm has moved to the desktop and mobile devices. As it turns out searching one's own files is a considerably different task as most of the time there is only one correct result. Not being able to search one's own documents can be really frustrating experience to the user. Therefore, a need exists for a system and method for efficient representation of digital documents in order to enable searching of digital documents in the handheld device.

SUMMARY OF THE INVENTION

Aspects of the present invention are to address at least the above-mentioned problems and/or disadvantages and to provide at least the advantages described below. Accordingly, an aspect of the present invention is to provide a method and device for representing digital documents for search applications. According to an aspect of the present invention, a method of a handheld device for generating a compressed representation of digital documents includes periodically obtaining one or more digital documents stored in a memory of a handheld device, and generating a compressed representation of the one or more digital documents stored in the memory of the handheld device using one or more balanced trees.

According to another aspect of the present invention, the method includes receiving a search query including one or more words from a user of the handheld device for searching for one or more digital documents, determining whether the one or more words correspond to one or more nodes in a word balanced tree by traversing through the nodes in the word balanced tree based on the search query, retrieving the one or more digital documents including the one or more words by traversing through a digital document map table and providing a search result including the one or more retrieved digital documents on the display of the handheld device if it is determined that the one or more words correspond to the one or more nodes, and returning a search query error on the display of the handheld device if it is determined that the one or more words do not correspond to the one or more nodes in the word balanced tree.

According to another aspect of the present invention, a non-transitory computer-readable storage medium having instructions stored therein for generating a compressed representation of digital documents, that when executed by a handheld device, cause the handheld device to perform a method described above.

According to yet another aspect of the present invention, a handheld device for generating a compressed representation of digital documents includes a processor, and memory coupled to the processor. The memory includes a document representation module for periodically obtaining one or more digital documents stored in a memory of a handheld device, and generating a compressed representation of the one or more digital documents stored in the memory of the handheld device using one or more balanced trees. The memory includes a search module for receiving a search query including one or more words from a user of the handheld device for searching for one or more digital documents, for determining whether the one or more words correspond to one or more nodes in a word balanced tree by traversing through the nodes in the word balanced tree based on the search query, retrieving the one or more digital documents including the one or more words by traversing through a digital document map table and provides a search result including the one or more retrieved digital documents on the display of the handheld device if it is determined that the one or more words correspond to one or more nodes in the word balanced tree, and returning a search query error on the display of the handheld device if it is determined that the one or more words do not correspond to the one or more nodes in the word balanced tree.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE ACCOMPANYING DRAWING

The above and other aspects, features, and advantages of certain exemplary embodiments of the present invention will be more apparent from the following description taken in conjunction with the accompanying drawings, in which:

FIG. 2 is a process flowchart of an exemplary method of searching for a digital document on a handheld device based on the compressed representation of digital documents according to an exemplary embodiment of the present invention.

FIG. 6A through 6C illustrate schematic representations of a page table, a data file, and a page memory system used in generating compressed representation of digital documents, according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of the exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
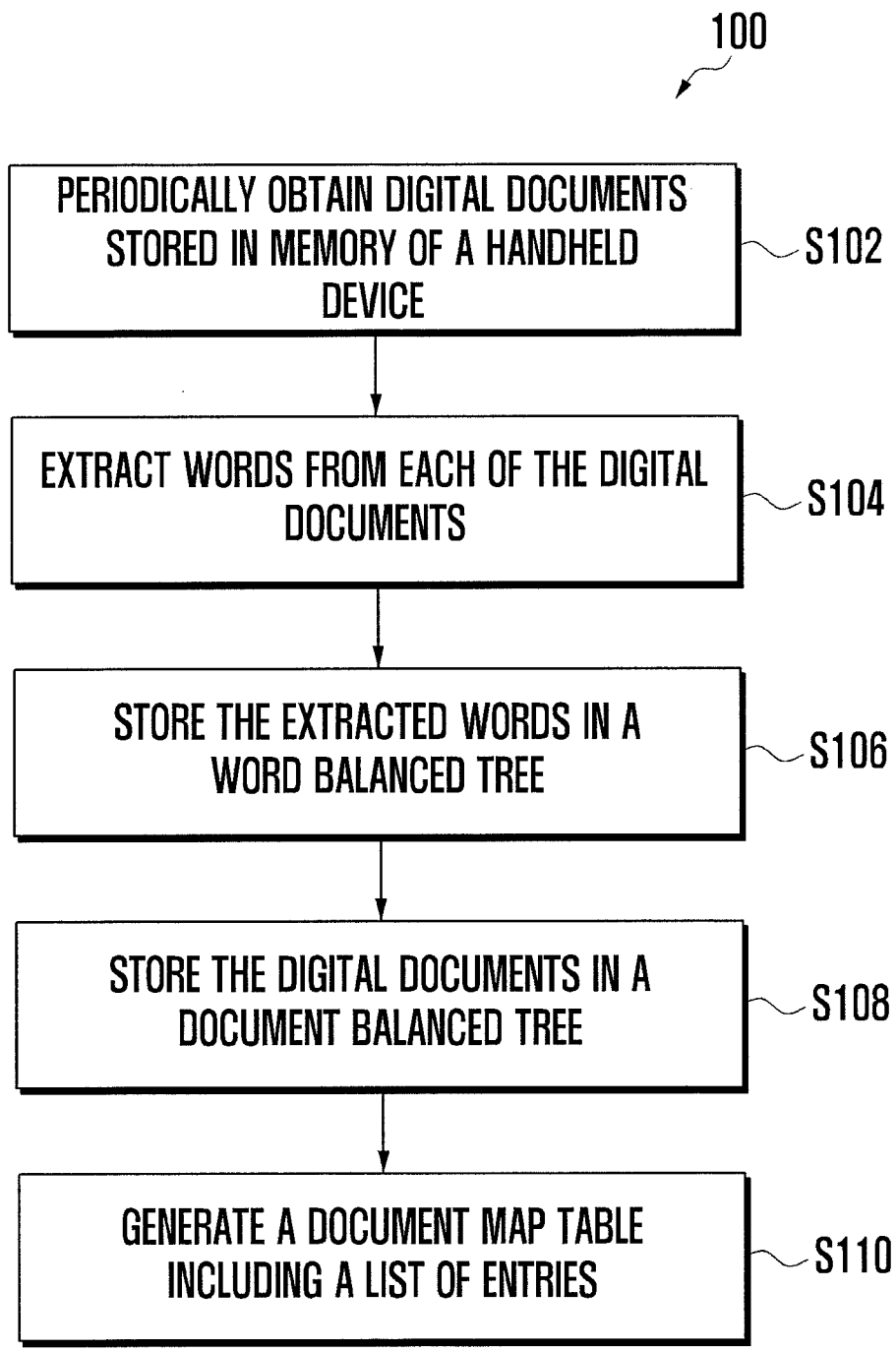
FIG. 1 illustrates a process flowchart of an exemplary method of generating a compressed representation of digital documents according to an exemplary embodiment of the present invention.

FIG. 1 illustrates a process flowchart 100 of generating a compressed representation of digital documents according to an exemplary embodiment of the present invention.

Referring to FIG. 1, at step 102, digital documents stored by a user in memory of a handheld device are periodically obtained. The digital documents may include music documents, image documents, word processor documents, email documents, Portable Document Format (PDF) documents and the like. The handheld device may be a mobile device, a Personal Digital Assistant (PDA), a smart phone, a tablet, or any other similar portable electronic device. An application stack in the handheld device periodically checks on updates of the digital documents and associated content in the memory.

At step 104, words in the periodically obtained documents are respectively extracted from title portions and content portions of the documents. At step 106, the extracted words are stored in a word balanced tree. It is appreciated that the word balanced tree supports the American Standard Code for Information Interchange (ASCII), Unicode and mixed language word strings. The word balanced tree includes a number of nodes. Each node in the word balanced tree represents one of the extracted words such that the word balance tree maintains single instance of each word. Also, each node stores pointer information associated with a first digital document including the associated word from a set of digital documents, a position of the associated word in the first digital document, and a number of occurrences of the associated word in the set of digital documents. According to an exemplary embodiment, the number of occurrences of the associated word in the set of digital documents is maintained such that a location of a first digital document in another set of digital documents is created when the number of occurrences becomes greater than a preset threshold value. According to another exemplary embodiment, the words in the word balanced tree are managed using a memory paging scheme, wherein, separate pages are allocated for words corresponding to each word length. Also, multiple pages may be allocated for words of each word length. The multiple pages are maintained using a page table having an actual memory addresses with a length for each page.

At step 108, the periodically obtained digital documents are stored in a document balanced tree having a number of nodes. Each node in the document balanced tree represents one of the periodically obtained digital documents. Each node stores digital document header information of an associated digital document, such as a document identifier, a time stamp, priority information, contextual information, or other similar header information. According to the present exemplary embodiment, the word balanced tree and the document balanced tree are different databases, each database being implemented as an AVL tree.

At step 110, a digital document map table, including one or more lists of entries, is generated. Each entry in a list of entries includes pointer information associated with one of the digital documents corresponding to one of the nodes in the document balanced tree. One or more entries in the list of entries stores an ordered sequence of words associated with one of the digital documents. If a word corresponding to a node in the word balanced tree is present in more than one digital document, then corresponding entries in the document map table may be interlinked in such a manner that pointer information in an entry associated with the first digital document points to the subsequent entry in the document map table untill the entry associated with the last digital document containing the same word points back to the node in the word balanced tree representing the word.

For example, in the document map table, links are formed between any two entries corresponding to two digital documents which contain the same word. In this manner, a list may be formed for 'n' entries corresponding to 'n' digital documents containing the same word, where the $n^{th}$ digital document points to the actual word in the word balance tree, thereby forming a circular linked list containing 'n' entries. Furthermore, if 'n' is a threshold size of the circular linked list, a new circular linked list is formed for a $(n+1)^{th}$ entry. If the $(n+1)^{th}$ entry corresponding to the digital document contains the same word, then the 'n' entry points to the $(n+1)^{th}$ entry. In this manner, the above described method provides a compressed representation of the digital documents stored in the handheld device.

In accordance with the above steps, in case where it is determined that a deletion of a digital document from the memory occurs, then it is determined whether any words present in the deleted digital document are present in any other digital documents. If the words are present, then the nodes corresponding to the words are removed from the document balanced tree and corresponding entry is updated in the document map table. Otherwise, the nodes corresponding to the words in the digital document are removed from the word balanced tree. Also, the node corresponding to the digital document is removed from the document balanced tree and the corresponding entry in the digital document map table is updated. It is understood that the above steps are also applicable to scenarios including changes to content within the digital documents in real time.

FIG. 2 is a process flowchart 200 of an exemplary method of searching for a digital documents on the handheld device based on the compressed representation of digital documents according to an exemplary embodiment of the present invention.

Referring to FIG. 1, at step 202, a search query to search for at least one digital document is received from a user of the handheld device. The search query entered by the user through an application interface may include at least one word associated with the digital document. At step 204, it is determined whether the at least one word corresponds to any nodes in the word balanced tree. The determination is made by traversing through the nodes of the word balanced tree based on the search query.

If the determination is true, at least one desired digital document including the at least one word is retrieved from the compressed representation of the digital document at step 206. The at least one desired digital document is retrieved by traversing through the digital document map table. At step 208, a search result including the at least one desired digital document is displayed on the display of the handheld device. Additionally, at step 210, the digital document map table is updated based on the search result provided to the user such that any entry associated with the at least one desired digital document retrieved are shuffled based on the search result. If no desired digital document is found at step 204, then at step 212, a search query error is returned on the display of the handheld device.

In a case where a user wishes to play a song titled "The World Song" by Michael Jackson on his/her handheld device, the user may search for the song by its title, artist, or genre information. In a case where the user wishes to search for the song by artist, the user may enter a search query "mic" on an idle screen. The search application searches five results corresponding to the search query and returns two songs, two phone book contacts and a phone setting feature. When the user adds further characters to the search query, two results are returned for two digital documents. On completing entry of characters for the query to be "Michael", still two records are shown as desired by the user.

The search application allows the user to perform a search for the song by entering different search queries like the artist name "Jackson", the song title "world", the "song" or genre information "pop". Similarly, the user may search for and retrieve any content on the device such as phone book contacts by using a first name, a last name, a number, an email id or any other field in a contact entry, or may search for and retrieve images by querying their tags and titles, may search for and retrieve messages (email, sms, mms) by sender, may search for and retrieve a recipient, a subject and a message text, may search for and retrieve files (word processing documents like .doc, .ppt, etc.) by a title and text in the content, notes, memos, calendar entries by title, a subject and any other text like comments, and applications by their title.

Moreover, in the present exemplary embodiment, a non-transitory computer-readable storage medium having instructions stored therein, such that when the instructions are executed by a handheld device, they cause the handheld device to perform the method of FIGS. 1 and 2.

Figure 3A:
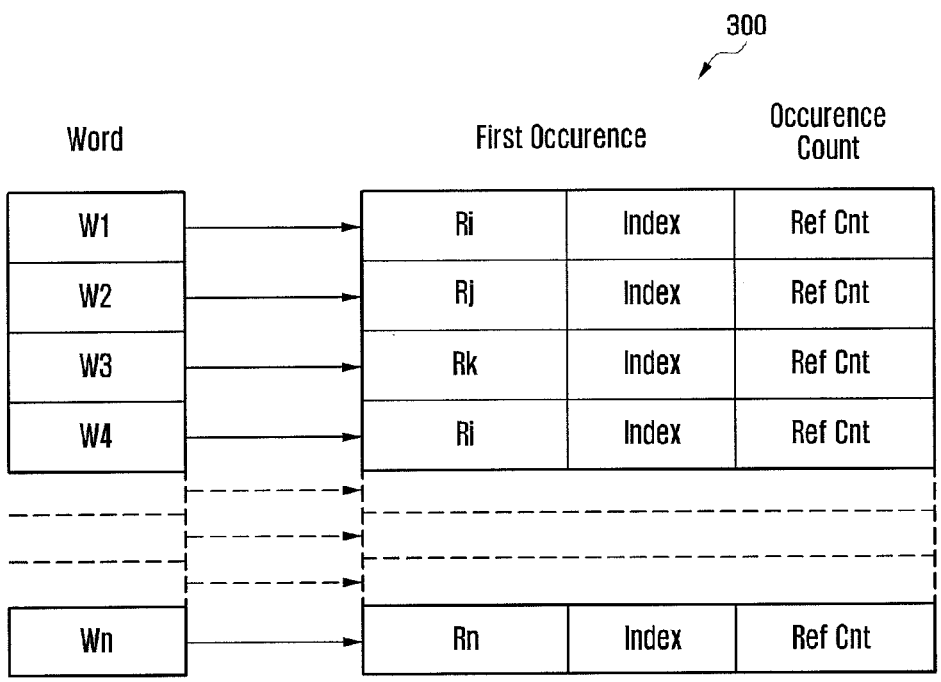
FIG. 3A is a schematic representation of a word database (or word balanced tree) containing n words extracted from a digital document according to an exemplary embodiment of the present invention.

FIG. 3A is a schematic representation 300 of a word database (or word balanced tree) containing n words extracted from a digital document according to an exemplary embodiment of the present invention.

Referring to FIG. 3A, the word database contains words W1, W2, W3, . . . , Wn represented through nodes. Each node corresponding to a word stores a pointer to a first digital document containing the word and a position of the word in the first document. In FIG. 3A, the first instance of the word W1 is found in a digital document Ri at a position denoted by a corresponding index. Similarly, the first instance of the word W2 is found in a digital document Rj at a position given by another corresponding index, wherein such a pattern of a corresponding index is repeated for each of the words W1 through Wn. Each node also stores a number of occurrences, i.e., a Reference Count (Ref Cnt) of a corresponding word in various digital documents. If the Ref Cnt becomes greater than a preset threshold value X, then a $(X+1)^{th}$ occurrence of the same word is treated as a first occurrence so that each first occurrence is a start node of the document balanced tree.

Figure 3B:
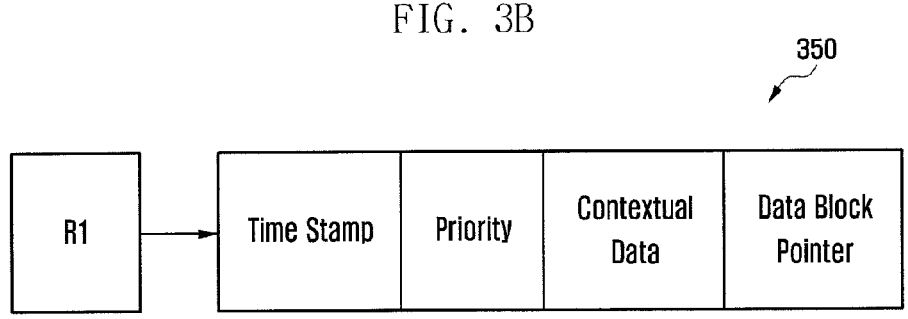
FIG. 3B is a schematic representation of a document database (or document balanced tree) containing 'n' digital documents according to an exemplary embodiment of the present invention.

FIG. 3B is a schematic representation 350 of a document database (or document balanced tree) containing 'n' digital documents according to an exemplary embodiment of the present invention.

Referring to FIG. 3B, the document balance tree contains digital documents R1, R2, R3, . . . , Rn represented through nodes. Each node corresponding to a digital document stores record header information such as a document identifier or a DataBlock Pointer, a time stamp, priority information, and contextual information or data.

Figure 4:
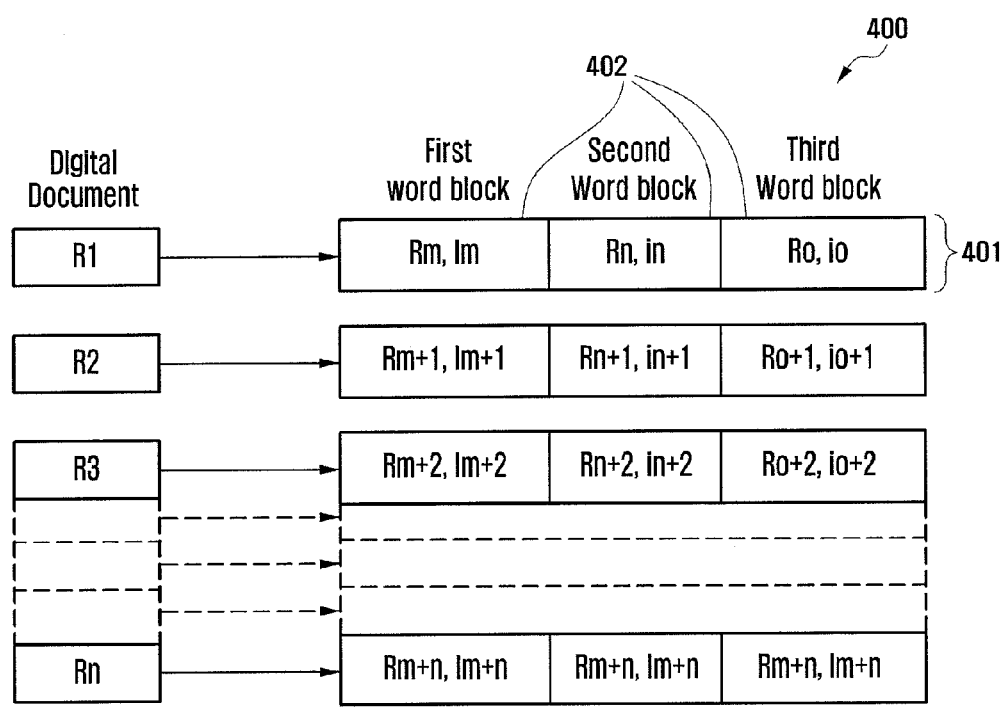
FIG. 4 is a schematic representation of a document map table representing an ordered sequence of words associated with each of the digital documents, according to an exemplary embodiment of the present invention.

FIG. 4 is a schematic representation 400 of a document map table representing an ordered sequence of words associated with each of the digital documents, according to an exemplary embodiment of the present invention.

Referring to FIG. 4, the document map table includes entries representing 'n' digital documents R1 through Rn and each entry stores associated pointer information. The associated pointer information points to a respective data block 401 containing information such as a title and content of the corresponding digital document. The data block 401 is made up of a plurality of individual word blocks 402 associated with each digital document. Each of the word blocks 402 denotes a word and stores an address of the digital document associated with the denoted word with an index position where the denoted word exists in the digital document. Thus, all digital documents having the same word are linked together.

For example, a word associated with a digital document Rm at a position lm is the same as a word in the digital document R1 at a first offset position in the digital document R1. Similarly, a word associated with a digital document Rn at a position ln is the same as the word in the digital document R1 at a second offset position in the digital document R1. In other words, a third word in the digital document R1 is same as the word in the digital document Ro at an offset position lo in the digital document Ro.

Figure 5:
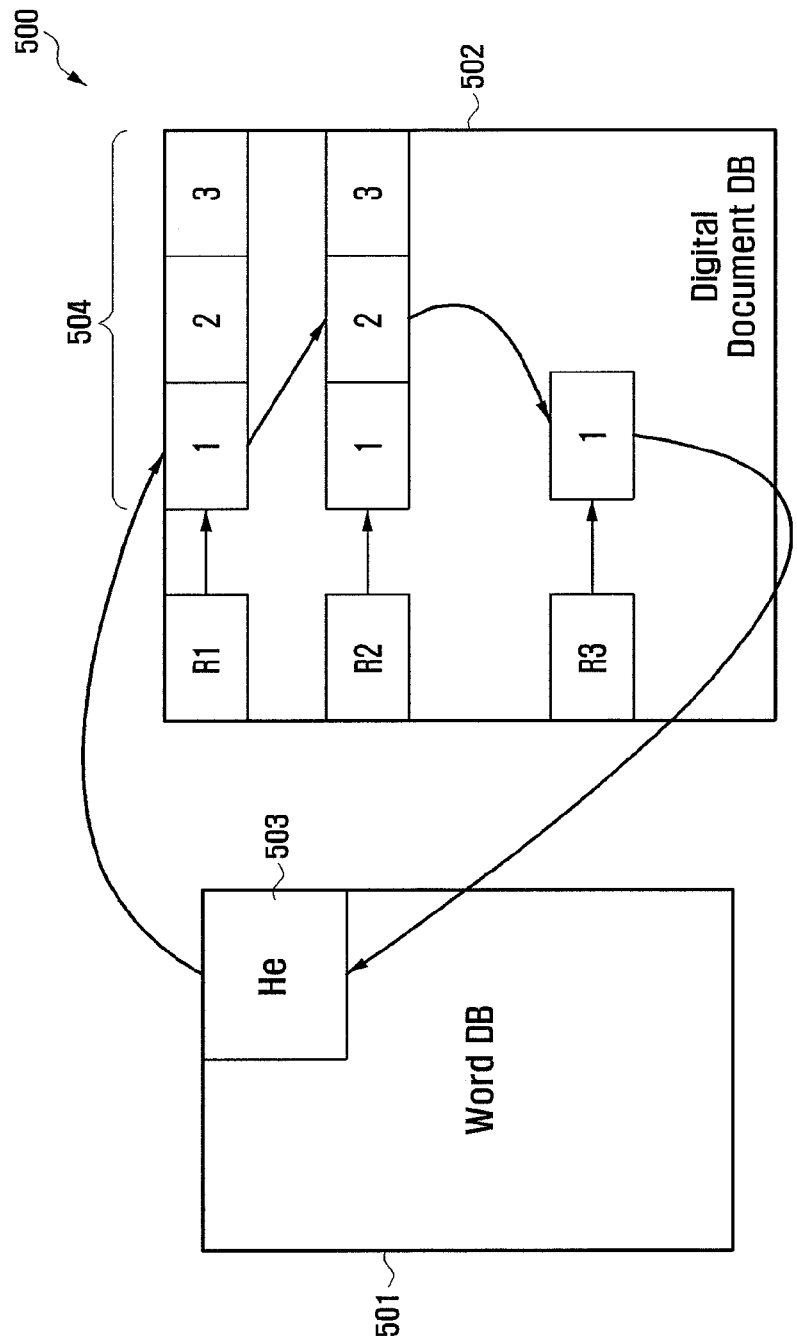
FIG. 5 is a schematic representation of a document map table representing interlinking between various digital documents including same words, according to another exemplary embodiment of the present invention.

FIG. 5 is a schematic representation 500 of a document map table representing interlinking between various digital documents including the same words according to another exemplary embodiment of the present invention.

Referring to FIG. 5, the document map table represents interlinking between a word database 501 and a digital document database 502. R1, R2, and R3 are three digital documents stored in the digital document database 502 containing data "he is fine", "is he fine" and "he" respectively. For a word 'he' represented by a node 503 in the word database, the first occurrence of the word 'he' points to a digital document 'R1' at an index 504 having a position '1'. At the first offset position of the digital document R1, the next occurrence of the word 'he' is stored.

The first offset position points to the digital document R2 at an index 504 having a position '2' as the word 'he' is at the second offset position of the digital document R2. Further, at the second offset position of the digital document R2, the next occurrence of the word 'he' is stored. The second offset position points to the digital document R3 at an index 504 having a position '1'. Since, there are no more digital documents that contain the word 'he', the first offset position of the digital document R3 points back to the node 503 corresponding to the word 'he' in the word database 501. Thus, a circular linked list with reference count for the word 'he equal to '3' is formed. This assists in inserting, editing, and deleting from the word database 501, and the record database 502.

Figure 6C:
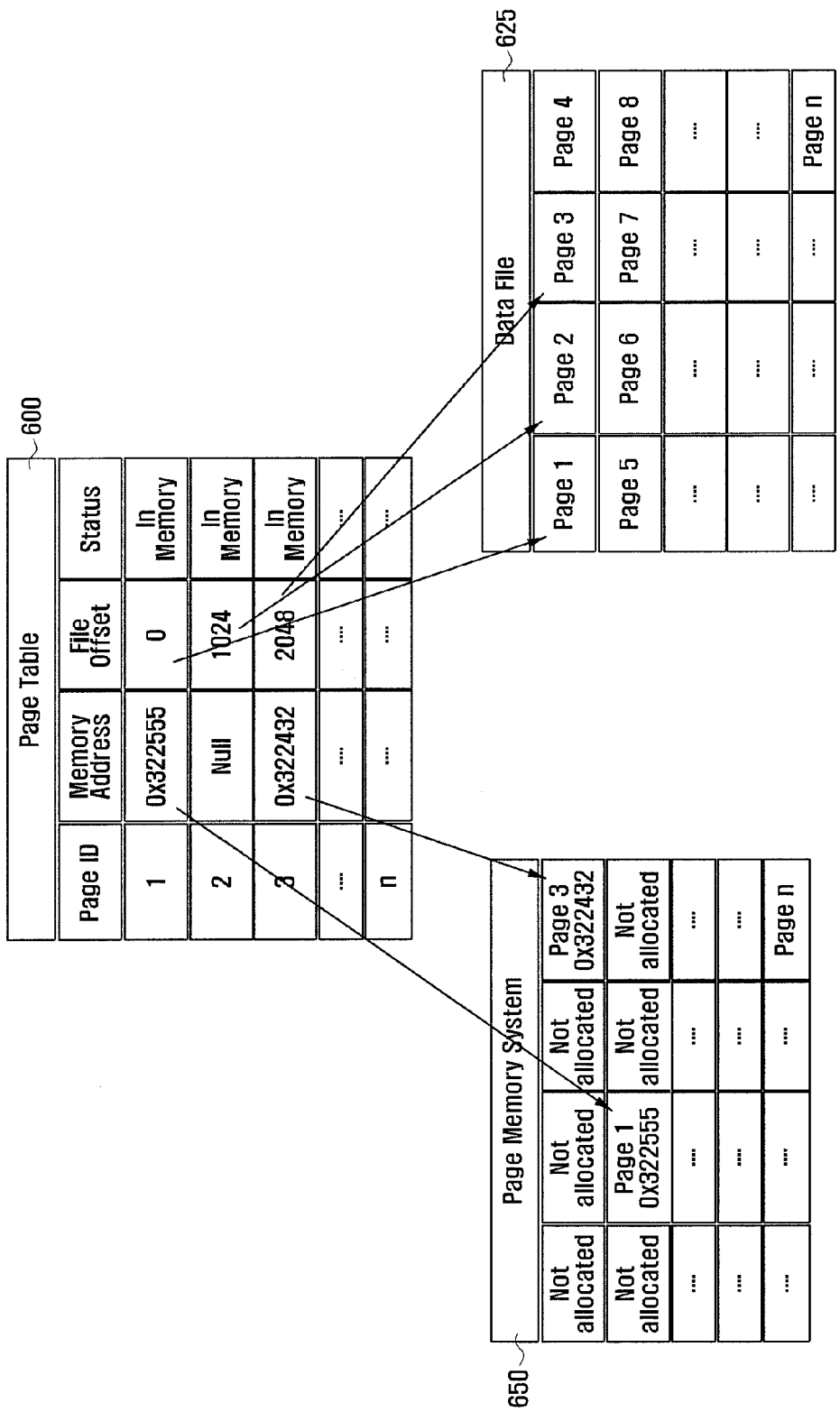

FIGS. 6A through 6C illustrate schematic representations of a page table, a data file, and a page memory system used in generating compressed representation of digital documents according to an exemplary embodiment of the present invention.

Referring to FIGS. 6A to 6C, a page table 600, a data file 625, and a page memory system 650 are respectively illustrated, and memory allocations are performed in terms of pages. The handheld device may be configured to have a page size between 1-4 Kilobytes (Kb). A configurable page size allows the handheld device be in congruence with page sizes used by its platform file system and also for minimizing waste of memory space. Moreover, memory allocations done in small chunks, such as 1-4 Kb, minimize chances of a memory allocation failing.

The page table 600 is maintained to keep track of the allocated chunks of memory. A page in the page table 600 is identified using its respective index, or Page Identification (ID) 601, in the page table 600. The page table 600 maintains allocated memory addresses 602 corresponding to different page IDs and other data like the page status 604, a number of allocated blocks in the page, a file offset 603 in the data file on the file system where the page is stored and so on.

In the present exemplary embodiment, a relative addressing mechanism may be implemented where an address is comprised of two parts, a page id and an offset within the page. For example, in a relative address of 24 bits, 16 bits may be used for the page id and a remaining 8 bits may be used for an offset within the page. In a 32-bit system, the relative addressing mechanism helps minimize address size as the page-id and offset used for an address is significantly smaller than the 32-bit address value. An address translation operation involves a look-up in the page table corresponding to the page id for the memory address of the page and subsequent addition of the offset within the page.

In another exemplary embodiment, system data comprising of pages allocated over a course of time is maintained in a form of a data file on the file system. These pages, which may be individual pages, are written sequentially in the data file in the order of their page IDs 601. The data file is updated periodically for changes in different pages over a given period of time. Since it is possible to track pages which get changed, only a selected number of pages need to be written to the data file in the periodic update. Accordingly, the data file updates occur more efficiently and at the same time minimize any overhead on the system performance. An example of the data file 625 is shown in FIG. 6B.

According to another exemplary embodiment, a mechanism of writing a page into a temporary file is used for maintaining atomicity of memory write operations and data integrity. Before a page in the page memory is updated for any changes, a backup of the page is made in a temporary file. The changes are subsequently made to the page which is then written to the data file on the file system. If the update of the data file for the given page is successful, the temporary file is deleted. If the update of the page in the data file fails, then the contents of the temporary file is written back to the data file for the given page. The above described backup operation helps to prevent any data loss and increases the data integrity in the event of un-anticipated circumstances like a battery drain-out or a system reset.

According to another exemplary embodiment, the page memory system 650 works with a limited number of pages in memory using the paged memory mechanism. Over a period of time, the database size may exceed a limited application memory. To overcome this problem, at any given point of time, a selected number of pages are formed in the memory. A page is brought into the memory when a reference is made to it while performing one of the operations. When a reference is made to a page which is not present in the page memory system 650, the page is read from the data file on the file system. A page's data location in the data file is denoted by the file offset value for the page in the page table. Since the application memory is limited, an existing page may need to be thrashed or deleted in order to make way for a new page from the data file. The existing pages are thrashed or deleted using a Least Recently Used mechanism. The thrashed or deleted pages are written back to the data file for any changes which are yet to be updated into the data file.

The page memory system 650 is shown in FIG. 6C. As shown, a page with Page ID 1 is located at address 0x322555 in the page memory system 650. A copy for the same page is maintained in the data file 625 of the file system at the location shown by Page 1. Similarly for a page with Page ID 2, the data is located at address 0x322432 in the system memory and at the location Page 2 in the data file 625. At any given point of time, only a selected number of pages are present in the page memory system 650. A page status in the page table 600 shows whether a page is present in the page memory system 650. When a referenced page is not present in the page memory system 650, it is read from the data file 625 into the page memory system 650 and its status and memory address is updated in the page table 600. If the number of pages in the page memory system 650 becomes equal to a threshold size, one or more pages are thrashed or deleted from the page memory system 650 and then written back into the data file 625.

Figure 7:
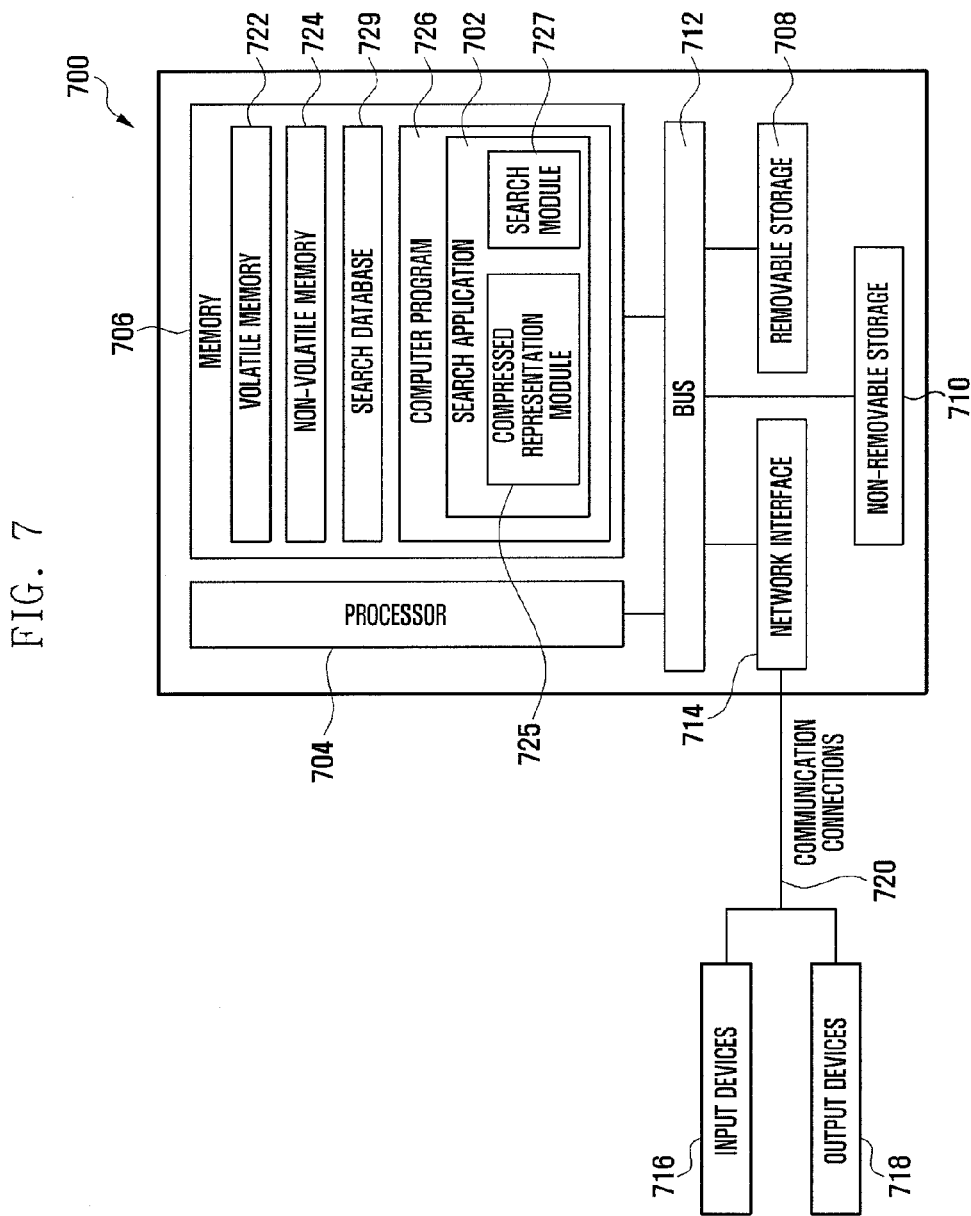
FIG. 7 shows an example of a handheld device for implementing embodiments of the present subject matter according to an exemplary embodiment of the present invention.

FIG. 7 shows an example of a handheld device 700 for implementing embodiments of the present subject matter according to an exemplary embodiment of the present invention.

Referring to FIG. 7, the below description intended to provide a brief, general description of the handheld device in which certain embodiments of the inventive concepts contained herein may be implemented.

The handheld device may include a processor 704, a memory 706, a removable storage 708, and a non-removable storage 710. The handheld device 700 additionally includes a bus 712 and a network interface 714. The handheld device 700 may include or have access to a computing environment that includes one or more user input devices 716, one or more output devices 718, and one or more communication connections 720, such as a network interface card or a Universal Serial Bus (USB) connection.

The one or more user input devices 716 may be a touch screen panel, a microphone, a keyboard, a stylus, or any other similar or suitable input device. The one or more output devices 718 may be a display panel, a speaker, or any other similar or suitable output device. The communication connections 720 may include a local area network connection, a wide area network connection, and any other similar or suitable connection to a network or an external device.

The memory 706 may include a volatile memory 708 and a non-volatile memory 710. The memory 706 also includes at least one computer program 726, including a search application 702 with a compressed representation module 725 and a search module 727. The memory 706 may also include a search database 729 coupled to the search application 702 and including a word balanced tree, a document balanced tree, and a document map table. A variety of computer-readable media may be stored in and accessed from the memory elements of the handheld device 700, such as the volatile memory 722 and the non-volatile memory 724, the removable storage 708 and the non-removable storage 710. Memory elements may include any suitable memory device for storing data and machine-readable instructions, such as a Read Only Memory (ROM), a Random Access Memory (RAM), an Erasable Programmable Read Only Memory (EPROM), an Electrically Erasable Programmable Read Only Memory (EEPROM), a hard drive, a removable media drive for handling compact disks, digital video disks, diskettes, optical disks, magnetic tape cartridges, memory cards, flash Memory Sticks, and the like.

The processor 704, as used herein, means any type of computational circuit, such as, but not limited to, a microprocessor, a microcontroller, a Complex Instruction Set Computing (CISC) microprocessor, a Reduced Instruction Set Computing (RISC) microprocessor, a very long instruction word microprocessor, an explicitly parallel instruction computing microprocessor, a graphics processor, a digital signal processor, or any other similar or suitable type of processing circuit. The processor 704 may also include embedded controllers, such as generic or programmable logic devices or arrays, application specific integrated circuits, single-chip computers, smart cards, and the like.

The exemplary embodiments of the present invention may be implemented in conjunction with program modules, including functions, procedures, data structures, and application programs, for performing tasks, or defining abstract data types or low-level hardware contexts, and stored on non-transitory computer readable mediums.

Machine-readable instructions stored on any of the above-mentioned storage media may be executable by the processor 704. For example, a computer program 726 may include machine-readable instructions capable of generating a compressed representation of digital documents in the word balanced tree, the document balanced tree, the document map table using the compressed representation module 725 and searching for a desired digital document in the search database 729 based on the compressed representation of the digital documents using a search module 727, according to the exemplary embodiments of the present invention. Although not required in all embodiments, the computer program 726 may be included on a CD-ROM and loaded from the CD-ROM to a hard drive in the non-volatile memory 724. The machine-readable instructions may cause the handheld device 700 to encode data according to the various exemplary embodiments of the present invention.

Figure 8:
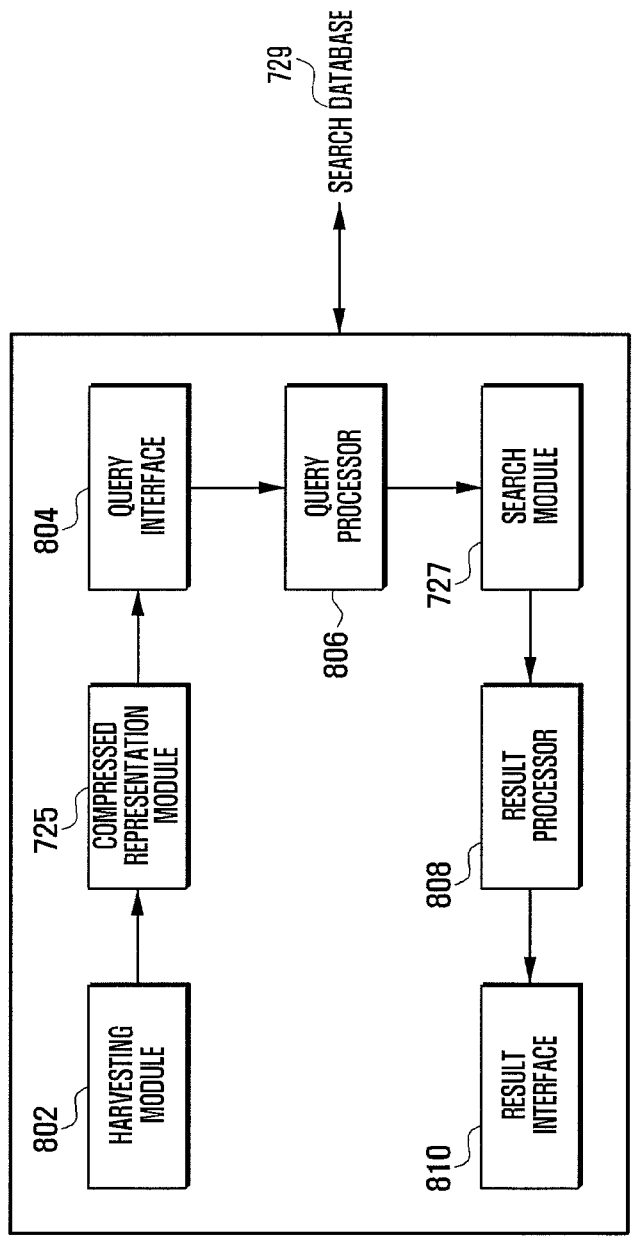
FIG. 8 illustrates a detailed view of a search application in a handheld device, according to an exemplary embodiment of the present invention.

FIG. 8 illustrates a detailed view of a search application in a handheld device, according to an exemplary embodiment of the present invention.

Referring to FIG. 8, a search application 702, stored on a handheld device 700, includes a harvesting module 802, a compressed representation module 725, a query interface 804, a query processor 806, a search module 727, a search result processor 808, and a result interface 810.

The harvesting module 802 interacts with different applications and services on the handheld device 700 in order to monitor the updating of digital documents and associated content. Accordingly, the compressed representation module 725 generates compressed representations of the digital documents or specific contents in the digital documents to be stored in the search database 729. When the user wishes to perform a search, the query interface 804 enables the user to input a search query through an input device. The search query may be a text string which can be written from an idle screen or an active screen the handheld device 700. Alternatively, the search query can be a touch input symbol or a voice query input to the handheld device 700.

The query processor 806 processes the search query into low level data manipulation commands and determines whether the search query is valid or invalid. If the search query is valid, the search module 727 searches the search database 729 by traversing through nodes of the word balanced tree, nodes of the document balanced tree and the document map table and fetches relevant results from the search database 729 for the given search query, as described above with reference to FIG. 2. The result processor 808 processes the search results fetched by the search module 727 in order to filter the search results for relevancy and appropriateness. The result interface 810 displays the search results on a display of the handheld device 700 or outputs the search results using the output devices 718 of the handheld device 700. Also, the result interface 810 receives selection of one of the search results from the user and invokes corresponding callback function.

Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for generating a compressed representation of digital documents on a handheld device, the method comprising:
   periodically obtaining one or more digital documents stored in a memory of a handheld device;
   extracting one or more words from each of the one or more digital documents; and
   generating a compressed representation of the one or more digital documents stored in the memory of the handheld device using one or more balanced trees,
   wherein the one or more balanced trees include at least one of a word balanced tree including a plurality of nodes, each of the plurality of nodes representing a word from among the one or more extracted words, and a document balanced tree including a plurality of nodes, each of the plurality of nodes representing a digital document from among the one or more digital documents,
   wherein each node of the word balanced tree comprises a position of the represented word in the digital document,
   wherein the generating of the compressed representation of the one or more digital documents using the one or more balanced trees comprises:
      storing the one or more extracted words in the word balanced tree including the plurality of nodes, such that each of the plurality of nodes represents a word in the one or more extracted words, and such that a word is associated with a node and includes pointer information associated with a first digital document including the associated word from a set of digital documents, a position of the associated word in the first digital document, and number occurrences of the associated word in the set of digital documents;
      storing the one or more digital documents in the document balanced tree including the plurality of nodes, such that each of the plurality of nodes represents a digital document in the one or more digital documents and includes the document header information; and
      generating a document map table including at least one entry in at least one list of entries representing the digital documents,
   wherein each of the at least one entry in the list of entries includes pointer information associated with one of the digital documents corresponding to one of the plurality of nodes in the document balanced tree,
   wherein the at least one entry in the list of entries represents an ordered sequence of words associated with one of the one or more digital documents, and
   wherein the first digital document is one of the one or more digital documents.

2. The method of claim 1, wherein the one or more digital documents are at least one of music documents, image documents, word processor documents, email documents, and portable document format documents.

3. The method of claim 1, wherein the document header information includes at least one of a document identifier, a time stamp, priority information, contextual information, and path information.

4. The method of claim 3, wherein the generating of the digital document map table including the at least one entry in the at least one list of entries representing the digital documents comprises:
   determining whether any word stored in the word balanced tree is present in two or more digital documents stored in the digital document balanced tree; and
   interlinking two or more entries of the at least one entry in the at least one list of entries corresponding to the two or more digital documents stored in the digital document map table in a circular linked list fashion such that an entry associated with the first digital document points to an entry associated with a subsequent digital document including the word until an entry associated with a last digital document points back to one of the plurality of nodes in the word balanced tree representing the word.

5. The method of claim 1, wherein the one or more words are extracted from at least one of a title portion and a content portion of each of the one or more digital documents.

6. The method of claim 1, wherein the storing of the one or more extracted words in the word balanced tree further comprises:
   counting an occurrence of the word associated with the node of the word balanced tree in the set of digital documents for one of the plurality of the nodes;
   determining whether the occurrence of the word associated with the node is greater than a predetermined occurrence threshold;
   restarting counting an occurrence of the word in another set of digital documents if the determined occurrence of the word associated with the node is greater than the predetermined occurrence threshold; and
   continuing the counting of the occurrence of the word in the set of digital documents until a number of occurrences of the word in the set of digital documents becomes equal to the predetermined occurrence threshold.

7. The method of claim 1, wherein storing the one or more extracted words in the word balanced tree further comprises:
   storing the one or more extracted words and associated digital documents in one or more pages in a page memory system, wherein the one or more pages are maintained using a page table including, for each of the one or more pages, associated page identifiers, a page status, and a number of allocated word blocks in each of the one or more pages.

8. The method of claim 1, wherein the generating of the compressed representation of the one or more digital documents using the one or more balanced trees further comprises:
   determining whether a deletion of at least one of the one or more digital documents occurs;
   determining whether one or more words in the at least one of the one or more digital documents are present in remaining ones of the one or more digital documents if the deletion occurs;
   removing a node corresponding to the at least one of the one or more digital documents from the document balanced tree and updating the corresponding entry in the digital document map table if the one or more words are present; and
   removing nodes corresponding to the one or more words in the at least one of the one or more digital documents from the word balanced tree and removing a node corresponding to the at least one of the one or more digital documents from the digital document balanced tree and updating the corresponding entry in the digital document map table if the one or more words are not present.

9. The method of claim 1, further comprising:
   receiving a search query including one or more words from a user of the handheld device for searching for one or more digital documents;

determining whether the one or more words correspond to one or more nodes in the word balanced tree by traversing through the nodes in the word balanced tree based on the search query;

retrieving the one or more digital documents including the one or more words by traversing through the digital document map table and providing a search result including the one or more retrieved digital documents on the display of the handheld device if it is determined that the one or more words correspond to the one or more nodes in the word balanced tree; and returning a search query error on the display of the handheld device if it is determined that the one or more words do not correspond to the one or more nodes in the word balanced tree.

10. The method of claim 9, wherein the retrieving of the one or more digital documents including the one or more words by traversing through the digital document map table comprises:

updating the digital document map table based on the search results provided to the user such that the entries associated with the one or more digital documents in the digital document map table are shuffled based on the search result.

11. A non-transitory computer-readable storage medium having instructions stored therein for generating a compressed representation of digital documents, that, when executed by a handheld device, cause the handheld device to perform a method comprising:

periodically obtaining one or more digital documents stored in a memory of a handheld device;

extracting one or more words from each of the one or more digital documents; and generating a compressed representation of the one or more digital documents stored in the memory of the handheld device using one or more balanced trees, wherein the one or more balanced trees include at least one of a word balanced tree including a plurality of nodes, each of the plurality of nodes representing a word from among the one or more extracted words, and a document balanced tree including a plurality of nodes, each of the plurality of nodes representing a digital document from among the one or more digital documents, wherein each node of the word balanced tree comprises a position of the represented word in the digital document, wherein the instructions to generate the compressed representation of the one or more digital documents using the one or more balanced trees comprises:

storing the one or more extracted words in the word balanced tree including the plurality of nodes, such that each of the plurality of nodes represents a word in the one or more extracted words, and such that a word is associated with a node and includes pointer information associated with a first digital document including the associated word from a set of digital documents, a position of the associated word in the first digital document, and number occurrences of the associated word in the set of digital documents;

storing the one or more digital documents in the document balanced tree including the plurality of nodes, such that each of the plurality of nodes represents a digital document in the one or more digital documents and includes document header information; and generating a document map table including at least one entry in at least one list of entries representing the digital documents, wherein each of the at least one entry in the list of entries includes pointer information associated with one of the digital documents corresponding to one of the plurality of nodes in the document balanced tree, wherein the at least one entry in the list of entries represents an ordered sequence of words associated with one of the one or more digital documents, and wherein the first digital document is one of the one or more digital documents.

12. The storage medium of claim 11, wherein the document header information includes at least one of a document identifier, a time stamp, priority information, contextual information, and path information.

13. The storage medium of claim 12, wherein the instructions to generate the digital document map table including at least one list of entries representing the digital documents comprises:

determining whether any word stored in the word balanced tree is present in two or more digital documents stored in the digital document balanced tree; and interlinking two or more entries of the at least one entry in the at least one list of entries corresponding to the two or more digital documents stored in the digital document map table in a circular linked list fashion such that an entry associated with the first digital document points to an entry associated with a subsequent digital document including the word until an entry associated with a last digital document points back to one of the plurality of nodes in the word balanced tree representing the word.

14. The storage medium of claim 13, wherein the instructions to store the one or more extracted words in the word balanced tree further comprises:

counting an occurrence of the word associated with the node of the word balanced tree in the set of digital documents of r one of the plurality of the nodes;

determining whether the occurrence of the word associated with the node is greater than a predetermined occurrence threshold;

restarting counting an occurrence of the word in another set of digital documents if the determined occurrence of the word associated with the node is greater than the predetermined occurrence threshold; and continuing the counting of the occurrence of the word in the set of digital documents until a number of occurrences of the word in the set of digital documents becomes equal to the predetermined occurrence threshold.

15. The storage medium of claim 14, wherein the instructions to store the one or more extracted words in the word balanced tree further comprises:

storing the one or more extracted words and associated digital documents in one or more pages in a page memory system, wherein the one or more pages are maintained using a page table including, for each of the one or more pages, associated page identifiers, a page status, and a number of allocated word blocks in each of the one or more pages.

16. The storage medium of claim 11, wherein the instructions to generate the compressed representation of the one or more digital document using the one or more balanced trees further comprises:

determining whether a deletion of at least one of the one or more digital documents occurs;

determining whether one or more words in the at least one of the one or more digital documents are present in remaining ones of the one or more digital documents if the deletion occurs;

removing a node corresponding to the at least one of the one or more digital documents from the document balanced tree and updating the corresponding entry in the digital document map table if the one or more words are present; and removing nodes corresponding to the one or more words in the at least one of the one or more digital documents from the word balanced tree and removing a node corresponding to the at least one of the one or more digital documents from the digital document balanced tree and updating the corresponding entry in the digital document map table if the one or more words are not present.

17. The storage medium of claim 11, wherein the method further comprises:

receiving a search query including one or more words from a user of the handheld device for searching for one or more digital documents;

determining whether the one or more words correspond to one or more nodes in the word balanced tree by traversing through the nodes in the word balanced tree based on the search query;

retrieving the one or more digital documents including the one or more words by traversing through the digital document map table and providing a search result including the one or more retrieved digital documents on the display of the handheld device if it is determined that the one or more words correspond to the one or more nodes in the word balanced tree; and returning a search query error on the display of the handheld device if it is determined that the one or more words do not correspond to the one or more nodes in the word balanced tree.

18. The storage medium of claim 17, wherein the instructions to retrieve the one or more digital documents including the one or more words by traversing through the digital document map table comprises:

updating the digital document map table based on the search results provided to the user such that the entries associated with the one or more digital documents in the digital document map table are shuffled based on the search result.

19. A handheld device for generating a compressed representation of digital documents, the device comprising:

a processor; and memory coupled to the processor, wherein the memory includes a document representation module for periodically obtaining one or more digital documents stored in a memory of a handheld device, extracting one or more words from each of the one or more digital documents, and generating a compressed representation of the one or more digital documents stored in the memory of the handheld device using one or more balanced trees, wherein the one or more balanced trees include at least one of a word balanced tree including a plurality of nodes, each of the plurality of nodes representing a word from among the one or more extracted words, and a document balanced tree including a plurality of nodes, each of the plurality of nodes representing a digital document from among the one or more digital documents, wherein each node of the word balanced tree comprises a position of the represented word in the digital document, wherein in the generating of the compressed representation of the one or more digital documents using the one or more balanced trees, the document representation module:

stores the one or more extracted words in the word balanced tree including the plurality of nodes, such that each of the plurality of nodes represents a word in the one or more extracted words, and such that a word is associated with a node and includes pointer information associated with a first digital document including the associated word from a set of digital documents, a position of the associated word in the first digital document, and number occurrences of the associated word in the set of digital documents, stores the one or more digital documents in the document balanced tree including the plurality of nodes, such that each of the plurality of nodes represents a digital document in the one or more digital documents and includes document header information, and generates a document map table including at least one entry in at least one list of entries representing the digital documents, wherein each of the at least one entry in the list of entries includes pointer information associated with one of the digital documents corresponding to one of the plurality of nodes in the document balanced tree, wherein the at least one entry in the list of entries represents an ordered sequence of words associated with one of the one or more digital documents, and wherein the first digital document is one of the one or more digital documents.

20. The device of claim 19, wherein the one or more digital documents are at least one of music documents, image documents, word processor documents, email documents, and portable document format documents.

21. The device of claim 19, wherein in the generating of the digital document map table including the at least one entry in the at least one list of entries representing the digital documents, the document representation module:

determines whether any word stored in the word balanced tree is present in two or more digital documents stored in the digital document balanced tree, and interlinks two or more entries of the at least one entry in the at least one list of entries corresponding to the two or more digital documents stored in the digital document map table in a circular linked list fashion such that an entry associated with the first digital document points to an entry associated with a subsequent digital document including the word until tan entry associated with a last digital document points back to one of the plurality of nodes in the word balanced tree representing the word.

22. The device of claim 21, wherein in the storing of the one or more extracted words in the word balanced tree, the document representation module:

stores the one or more extracted words and associated digital documents in one or more pages in a page memory system, wherein the one or more pages are maintained using a page table including, for each of the one or more pages, associated page identifiers, a page status, and a number of allocated word blocks in each of the one or more pages.

23. The device of claim 19, wherein in the generating of the compressed representation of the one or more digital document using the one or more balanced trees, the document representation module:

determines whether a deletion of at least one of the one or more digital documents occurs, determines whether one or more words in the at least one of the one or more digital documents are present in remaining ones of the one or more digital documents if the deletion occurs, removes a node corresponding to the at least one of the one or more digital documents from the document balanced tree and updates the corresponding entry in the digital document map table if the one or more words are present in the at least one of the one or more digital documents, and removes nodes corresponding to the one or more words in the at least one of the one or more digital documents from the word balanced tree and removes a node corresponding to the at least one of the one or more digital documents from the digital document balanced tree and updates the corresponding entry in the digital document map table if the one or more words are not present in the at least one of the one or more digital documents.

24. The device of claim 19, wherein the memory further includes:
a search module for:
receiving a search query including one or more words from a user of the handheld device for searching for one or more digital documents,
determining whether the one or more words correspond to one or more nodes in the word balanced tree by traversing through the nodes in the word balanced tree based on the search query,
retrieving the one or more digital documents including the one or more words by traversing through the digital document map table and providing a search result including the one or more retrieved digital documents on the display of the handheld device if it is determined that the one or more words correspond to one or more nodes in the word balanced tree, and
returning a search query error on the display of the handheld device if it is determined that the one or more words do not correspond to one or more nodes in the word balanced tree.

25. The device of claim 24, wherein in the retrieving of the one or more digital documents including the one or more words by traversing through the digital document map table, the search module updates the digital document map table based on the search results provided to the user such that the entries associated with the one or more digital documents in the digital document map table are shuffled based on the search result.

* * * * *